(12) United States Patent
Blinick et al.

(10) Patent No.: US 9,208,094 B2
(45) Date of Patent: Dec. 8, 2015

(54) MANAGING AND SHARING STORAGE CACHE RESOURCES IN A CLUSTER ENVIRONMENT

(71) Applicant: INTERNATIONAL BUSINESS MACHINES CORPORATION, Armonk, NY (US)

(72) Inventors: Stephen L. Blinick, Tucson, AZ (US); Daniel W. Fok, Tucson, AZ (US); Chao G. Li, Shanghai (CN); Yang Liu, Shanghai (CN); Paul H. Muench, San Jose, CA (US)

(73) Assignee: GlobalFoudries, Inc., Grand Cayman (KY)

( * ) Notice: Subject to any disclaimer, the term of this patent is extended or adjusted under 35 U.S.C. 154(b) by 185 days.

(21) Appl. No.: 13/960,051

(22) Filed: Aug. 6, 2013

(65) Prior Publication Data

US 2015/0046656 A1    Feb. 12, 2015

(51) Int. Cl.
*G06F 12/08*         (2006.01)
(52) U.S. Cl.
CPC ............ *G06F 12/0848* (2013.01); *G06F 12/08* (2013.01); *G06F 12/0862* (2013.01)
(58) Field of Classification Search
CPC .............................. G06F 12/08; G06F 12/0848

USPC ......................................................... 711/129
See application file for complete search history.

(56) References Cited

U.S. PATENT DOCUMENTS

| | | | |
|---|---|---|---|
| 5,293,609 A * | 3/1994 | Shih et al. ...................... 711/137 |
| 5,434,992 A * | 7/1995 | Mattson ......................... 711/119 |
| 5,717,893 A * | 2/1998 | Mattson ......................... 711/129 |
| 8,108,620 B2 | 1/2012 | Anderson et al. |
| 2008/0140937 A1 | 6/2008 | Nalawade et al. |
| 2009/0144388 A1 | 6/2009 | Gross et al. |
| 2013/0166724 A1 * | 6/2013 | Bairavasundaram et al. 709/224 |

* cited by examiner

*Primary Examiner* — Sanjiv Shah
*Assistant Examiner* — Gautam Sain
(74) *Attorney, Agent, or Firm* — Griffiths & Seaton PLLC

(57) ABSTRACT

Systems and methods are provided for managing storage cache resources among all servers within the cluster storage environment. A method includes partitioning a main cache of a corresponding node into a global cache and a local cache, sharing each global cache of each node with other ones of the nodes of the multiple nodes, and dynamically adjusting a ratio of an amount of space of the main cache making up the global cache and an amount of space of the main cache making up the local cache, based on access latency and cache hit over a predetermined period of time of each of the global cache and the local cache.

14 Claims, 3 Drawing Sheets

MANAGING AND SHARING STORAGE CACHE RESOURCES IN A CLUSTER ENVIRONMENT

BACKGROUND OF THE INVENTION

1. Field of the Invention

The present invention relates in general to storage networks and more particularly, to sharing storage in a cluster environment.

2. Description of the Related Art

Cluster storage environments typically use shared storage networks, such as storage area networks (SAN) or network attached systems (NAS) to provide data storage services for multiple servers. In particular, a cluster system includes multiple data processing systems (i.e., nodes) that are networked and share hardware and software. To improve availability and speed, each server included in the cluster systems may have its own storage cache system, which in many cases may be a flash device attached directly to the server, for storing most frequently accessed data. Typically, a cache system of one server is not shared with other servers within the network. As each server in the network operates at varying workloads, some of the servers may have very high cache utilization while others may have low cache utilization at any given time.

SUMMARY OF THE INVENTION

Many cluster storage environments are provided with high speed interconnect network components, such as Ethernet or InfiniBand switched fabric communication links, which allow the servers in the cluster to quickly access data from each other. The servers may access the same set of data for sharing purposes or for a sequential access pattern. Although data is quickly accessible due to the high speed interconnect network, it is desirable to improve system efficiency by maintaining a single copy of data among the multiple servers of the network to thereby reduce cache space usage and the overhead of cache consistency management.

To improve network system efficiency, embodiments are provided for managing storage cache resources among all servers within the cluster storage environment. In an embodiment, by way of example only, a method is provided for managing storage cache resources among multiple nodes within a cluster environment. The method includes partitioning a main cache of a corresponding node into a global cache and a local cache, sharing each global cache of each node with other ones of the nodes of the multiple nodes, and dynamically adjusting a ratio of an amount of space of the main cache making up the global cache and an amount of space of the main cache making up the local cache, based on access latency and cache hit over a predetermined period of time of each of the global cache and the local cache.

In another embodiment, by way of example only, a system for managing storage cache resources among multiple nodes within a cluster environment is provided. The system includes a plurality of nodes each including a memory having a main cache and a processor device coupled to the memory. The processor device is configured for partitioning the main cache of a corresponding node into a global cache and a local cache, sharing the global cache of the corresponding node with other ones of the plurality of nodes, and dynamically adjusting a ratio of an amount of space of the main cache making up the global cache and an amount of space of the main cache making up the local cache, based on access latency and cache hit over a predetermined period of time of each of the global cache and the local cache.

In still another embodiment, by way of example only, a computer program product for managing storage cache resources among multiple nodes within a cluster environment is provided. The computer program product comprises a computer-readable storage medium having computer-readable program code portions stored therein and includes computer-readable code for partitioning a main cache of a corresponding node into a global cache and a local cache, computer-readable code for sharing each global cache of each node with other ones of the nodes of the multiple nodes, and computer-readable code for dynamically adjusting a ratio of an amount of space of the main cache making up the global cache and an amount of space of the main cache making up the local cache, based on access latency and cache hit over a predetermined period of time of each of the global cache and the local cache.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide methods for managing storage cache resources among all of the servers within a cluster storage environment including a plurality of nodes to thereby improve cache utilization among all cache devices in the network and improve overall system performance. Generally, each node includes a server, and each server within the cluster storage environment has a cache device that is divided into a local cache or local cache region and a global cache or global cache region. The local cache region is managed by a local cache directory and is used only for local data storage, while the global cache region is managed by a shared global cache directory and used by its corresponding node and other nodes within the network. Each server is also configured to arbitrate memory space allocation between the local and global cache regions based on workload and cache usage and can determine whether to use its global cache region based on a comparison of performance between global cache access and direct storage access via the SAN/NAS network. One of the nodes within the network, and hence its corresponding server, is configured to serve as a controller and thus, coordinates the shared global cache regions, for example, by invalidating one of the global cache regions, maintaining a single copy of data in one of the global cache regions, maintaining consistency among the global cache regions, and the like. The controller server can be one of the server nodes or a storage node including the direct storage access.

Figure 1:
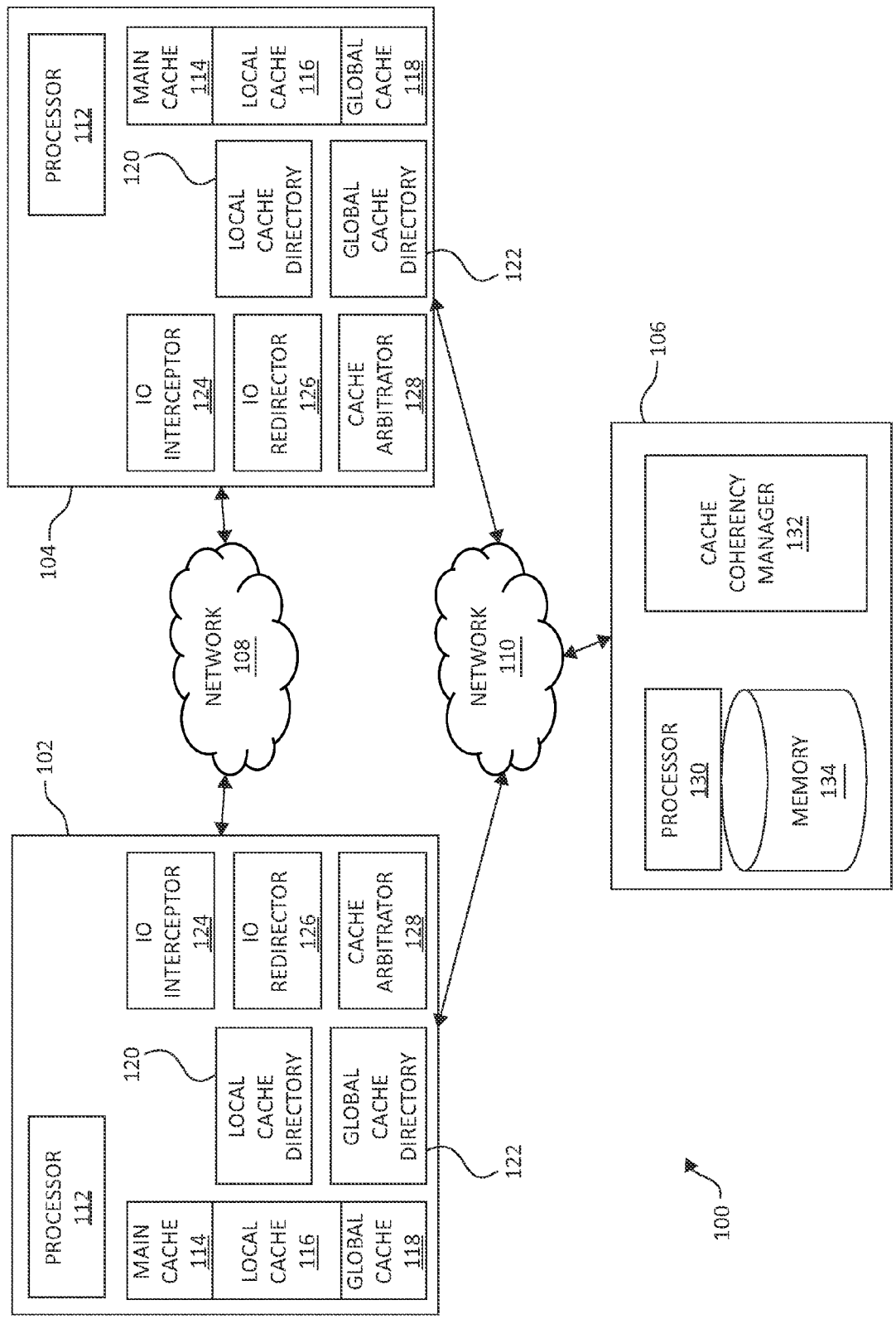
FIG. 1 illustrates a block diagram of a multi-nodal computing environment, according to an embodiment.

FIG. 1 is a block diagram of a multi-nodal computer system 100, according to an embodiment. Multi-nodal computer system 100 includes server nodes 102 and 104 and a storage node 106, where server nodes 102 and 104 are communicatively coupled via a network 108, and server nodes 102 and 104 communicate with storage node 106 via a network 110. Although two server nodes 102 and a single storage node 106 are illustrated, other embodiments include more than two server nodes 102 or more than one storage node 106. Additionally, although two networks 108 and 110 are included in system 100, alternatively, server nodes 102 and 104 and storage node 106 communicate via one network.

Each server node 102 and 104 may comprise any general purpose computer, such as a workstation, a personal computer, a mainframe computer, etc., and may comprise similar or different machines, running the similar or different operating systems. Some exemplary operating systems include AIX®, UNIX, Windows®, etc. Server nodes 102 and 104 are substantially identically configured, in an embodiment. In another embodiment, server nodes 102 and 104 are employed for different purposes and are not identically configured. In any case, each server node 102 and 104 generally includes a processor 112 and a memory 114. Processor 112 exchanges signals with networks 108 and 110 and hence, server nodes 102 or 104 or storage node 106, via Ethernet cards, small computer system interfaces ("SCSIs"), parallel data ports, serial data ports, telephone modems, fiber optic links, wireless links, etc.

Main cache 114, also referred to as a memory, is configured for temporarily storing prefetched data for quick access. In another embodiment, main cache 114 is a very fast input/output device, such as a Peripheral Component Interconnect (PCI)-Express based direct attached solid state devices (SSD). Main cache 114 is partitioned into a local cache 116 and a global cache 118. Local cache 116 is managed by a local cache directory 120, which stores information about data stored in local cache 116 and is accessible only by processor 112 of the corresponding node 102 or 104. Hence, local cache 116 is used only by the node on which it resides. As a result, for example, local cache 116 of node 102 is only used by node 102, and local cache 116 of node 104 is only used by node 104. Global cache 118 is shared among all of server nodes 102 and 104 and is managed by a shared global cache directory 122.

To manage main cache 114 (local cache 116 and global cache 118, in particular) and to perform IO requests, each of server nodes 102 and 104 includes various modules configured to be accessed by its corresponding processor 112, including, but not limited to, an IO interceptor 124, IO redirector 126, and a cache arbitrator 128. IO interceptor 124 intercepts all incoming IO requests and directs the IO request to local cache directory 120, global cache directory 122. Paths are setup for the IO requests by IO redirector 126, which acts as a routing tunnel to direct the requests to the correct locations and complete the IO requests via the paths.

The determination of where an IO request is to be directed is based, in part, on whether data resides in local cache 116, global cache 118, or in neither. Specifically, when an IO request is received, IO interceptor 124 accesses local cache directory 120 to determine if requested data is listed therein. If not, IO interceptor 124 then checks global cache directory 122. Global cache directory 122 lists all of the data that is stored in any global cache 118 of server nodes 102, 104 and other server nodes in system 100 not shown. It will be appreciated that global cache directory 122 will be periodically synched to all other global cache directories 122 of other server nodes to maintain up-to-date data therein. Hence, if the data is not included in global cache directory 122 (and hence, not in any global cache 118), IO interceptor 124 directs the IO request to IO redirector 126. IO redirector 126 pre-fetches the data. Hence, if IO redirector 126 receiving an original IO request resides on server node 102, IO redirector 126 transfers the IO request from server node 102 to corresponding IO redirector 126 of server node 104, which then access local directory 120 and global cache directory 122 of server node 104 to determine whether the IO request can be fulfilled by server node 104. If the IO request cannot be fulfilled, IO redirector 126 directs the IO request to storage node 108 which triggers an asynchronous pre-fetch of the data to main cache 114 of server node 102 from which the IO request originated.

To ensure that main cache 114 of server node 102 has sufficient free space to store pre-fetched data, cache arbitrator 128 checks for free space in main cache 114. In particular, cache arbitrator 128 checks for free space in local cache 116 of server node 102 and for free space in global cache 118 of server node 102 and global cache 118 of server node 104 or other server nodes of system 100 not shown. If there is not a sufficient amount of free space in one local cache 116 of server node 102 or in a global cache 118 of either server node 102, 104 or other server node (not shown), cache arbitrator 128 dynamically adjusts a ratio of an amount of space of main cache 114 making up local cache 116 and an amount of space of the main cache 114 making up global cache 118, based on access latency and cache hit over a predetermined period of time of each of local cache 116 and global cache 118. In an embodiment, cache arbitrator 128 determines how much of main cache 114 is allocated to local cache 116 or to global cache 118 based on workload (for example, IO request traffic and the like) and cache usage, and whether to use global cache 118 based on the performance of the access to global cache 118 and direct storage access at storage node 106. In order for at least some of main cache 114 to be dedicated to each cache region, predetermined low cache watermarks are set for each of local and global caches 116 and 118. For example, a low cache watermark for local cache 116 is set at no lower than about 30% of a total cache capacity of main cache 114 so that at least 30% of main cache 114 is dedicated to local cache 116 at all times. Similarly, a low cache watermark for global cache 118 is set at no lower than about 2% of the total cache capacity of main cache 114. It will be appreciated that in other embodiments, the low cache watermarks for local and/or global cache 116 or 118 is set at higher or lower than about 2% (for local cache 116) or about 30% (for global cache 118).

In an embodiment, cache arbitrator 128 operates by maintaining a linked list having entries that are stored in main cache 114, which may comprise data buffered in cache prefetched from storage node 108 or waiting to be written thereto. Different lists are maintained for each of local cache 116 and global cache 118. Each data entry in the lists is monitored using a Least Recently Used (LRU) cache technique, if a location in local or global cache region 116 or 118 is accessed, i.e., a cache "hit", then the entry in the LRU list for the accessed track is moved to a Most Recently Used (MRU) end of the list. If the requested track is not in the cache, i.e., a cache miss, then the track in the local or global cache region 116 or 118 whose entry is at the LRU end of the list eventually over time or due to another criteria, such as space free-ing as described below, may be removed (or destaged back to storage) and an entry for the track data staged into local or global cache region 116 or 118 from the storage is added to the MRU end of the LRU list.

Cache arbitrator 128 determines main cache 114 allocation by measuring the local cache access latency (L_L) and the average global cache access latency (G_L) and by calculating access or "cache hit" of the local cache 116 (LCH) and the cache hit of the global cache 118 (GCH) within a fixed period of time (e.g., five (5) minutes or another time period). In another example, cache hit is determined by calculating the hit counts of a fixed count of the cache contents in the bottom of a least recently used (LRU) list.

To compare usage of local cache 116 to global cache 118, the following formula is used: LCH>GCH*L_L/G_L. If after calculation the aforementioned statement is true, then a percentage of free space of global cache 118, for example, about 0.1%, is re-allocated to local cache 116. In an embodiment, if global cache 118 of one node 102 or 104 does not have free space, then some of the contents in global cache 118 are swapped with free cache segments in global cache directory 122. In an example, global cache 118 of node 102 may swap a portion of its contents for free space on global cache 118 of node 104. If no free space is available in any global cache 118 of any of the nodes 102 or 104, a lower portion of the LRU list (specifically, the portion of the LRU list including content least recently used) is demoted.

If LCH>GCH*L_L/G_L is not true, then a percentage of free space from local cache 116, for example, about 0.1%, is allocated to global cache 118. If local cache 116 does not have free space, the lower part of the LRU list is demoted. Specifically, a comparison is made of the access latency of the direct storage access (i.e., to storage node 108) and access latency of global cache 118 of server node 102, global cache 118 of server node 104, and any other global cache on any other server node of system 100. If the access latency of global cache 118 is smaller, then start to cache data on global cache 118. In an embodiment, data does not have to be cached in global cache 118 at which the IO requests originates. Thus, the data can be cached in the free space in global cache 118 of either server node 102 or 104 or another server node in system 100. If the access latency is not smaller, then the IO is performed directly at storage node 108.

Storage node 108 may comprise any general purpose computer, such as a workstation, a personal computer, a mainframe computer, etc., and may comprise similar or different machines, running the similar or different operating systems. Some exemplary operating systems include AIX®, UNIX, Windows®, etc. Storage node 108 is configured to store data and includes a processor 130, a cache coherency manager 132, and a memory 134 for direct access by one of server nodes 102 or 104, if data is not found on corresponding main cache 114. Processor 130 is configured substantially similarly to processor 110 and is configured to communicate with cache coherency manager 132 and storage 134. Memory 134 may generally include long term memory, such as disks, tapes, and the like, and may or may not include temporary storage, such as a cache. Cache coherency manager 132 is accessible by IO redirector 126 of each server node 102 and 104 is configured to control which server node 102 or 104 has permission to cache data. In this regard, when an IO request, in particular, a write operation, is originated from one node 102 or 104, cache coherency manager 132 allows the data to be written to main cache 114 of the originating node 102 or 104 and notifies the other nodes to purge their cache of the stale data to thereby achieve data coherency in system 100.

As noted above, storage cache resources are managed among multiple nodes within a cluster environment, generally by partitioning main cache 114 of a corresponding node into local cache 116 and global cache 118, sharing each global cache 118 of each node 102 and 104 with other ones of the nodes of the multiple nodes, and dynamically adjusting a ratio of an amount of space of main cache 114 making up local cache 116 and an amount of space of main cache 114 making up global cache 118, based on access latency and cache hit over a predetermined period of time of each of global cache 118 and the local cache 116. When receiving IO requests, system 100 may receive a pre-fetch request and, depending on whether main cache 114 includes the requested data, may pre-fetch data to local or global cache 116 or 118.

Figure 2:
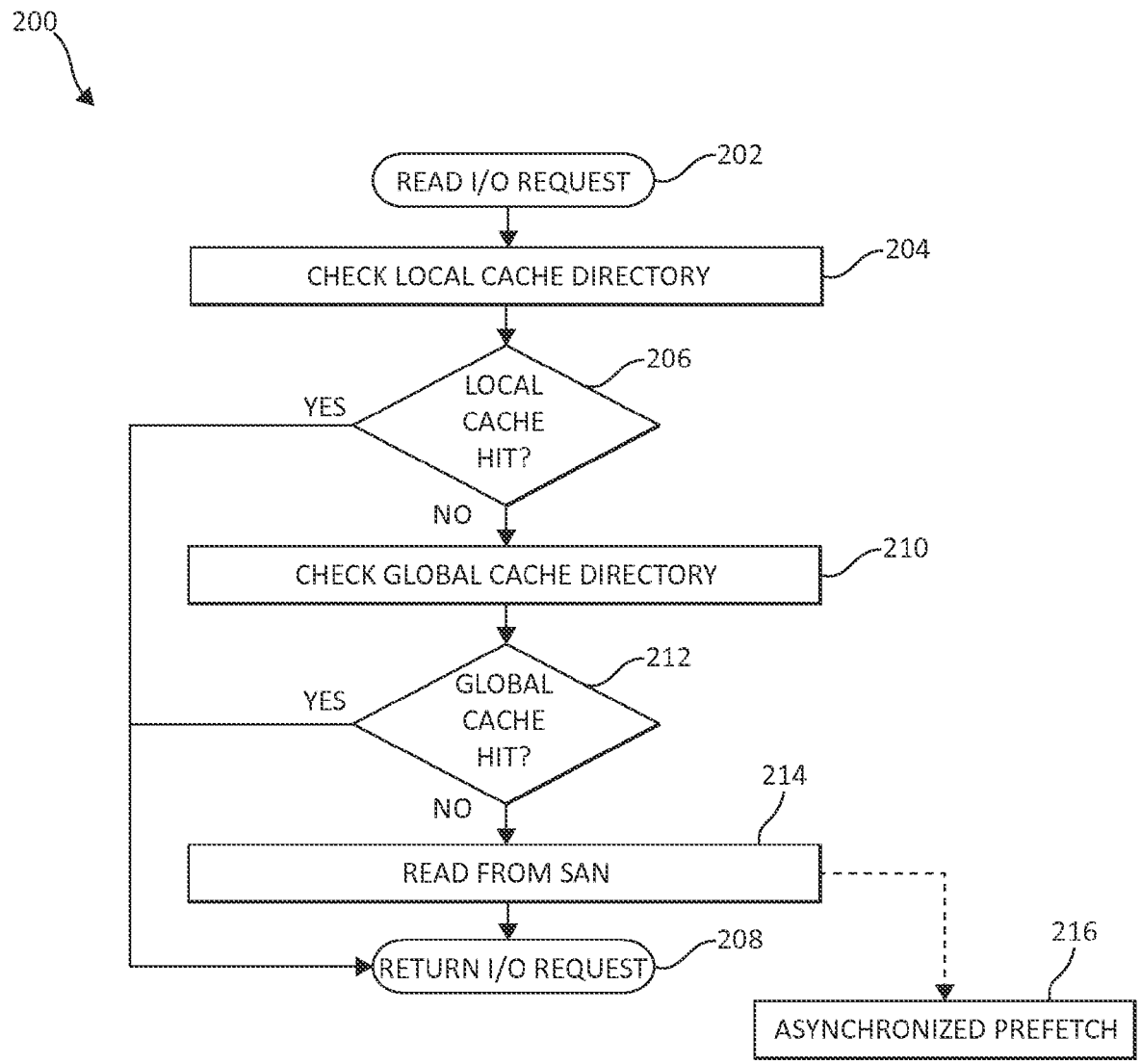
FIG. 2 is a flow diagram illustrating a method for reading data from a cache, according to an embodiment.

FIG. 2 is a flow diagram of a method 200 of reading data from a cache (such as main cache 114), according to an embodiment. When an IO request is received, the IO request is read at 202. For example, IO interceptor 124 determines the nature of the IO request, which for example, may be a request to read particular data. At 204, local cache directory 126 is checked, in response to the IO request. IO interceptor 124 looks to local cache directory 126 to determine whether the requested data is listed therein. A determination is made as to whether there is a local cache hit at 206. In an embodiment, IO interceptor 124 finds the requested data listed in local cache directory 126 and is able to access the requested data from local cache 116. The IO result is returned at 208 and method 200 ends. In another embodiment, IO interceptor 124 does not find the requested data from listed in local cache directory 126 and then moves to 210, where global cache directory 128 is checked. Specifically, IO interceptor 124 refers to global cache directory 128 to determine whether the requested data is listed therein and thus, whether there is a global cache hit at 212. If the requested data is found in global cache directory 128, then the result is returned at 208 and the method 200 ends. If the requested data is not found in global cache directory 128, then the IO request is read from a direct storage access via the storage area network (SAN) at 214. In particular, the IO request is directed to storage node 106 and read from memory 134. Then the result is returned at 208 and the method 200 ends. A read from the direct storage access triggers an asynchronized prefetch at 216 so that the data read from memory 134 can be more easily accessible by server node 102 or 104.

Figure 3:
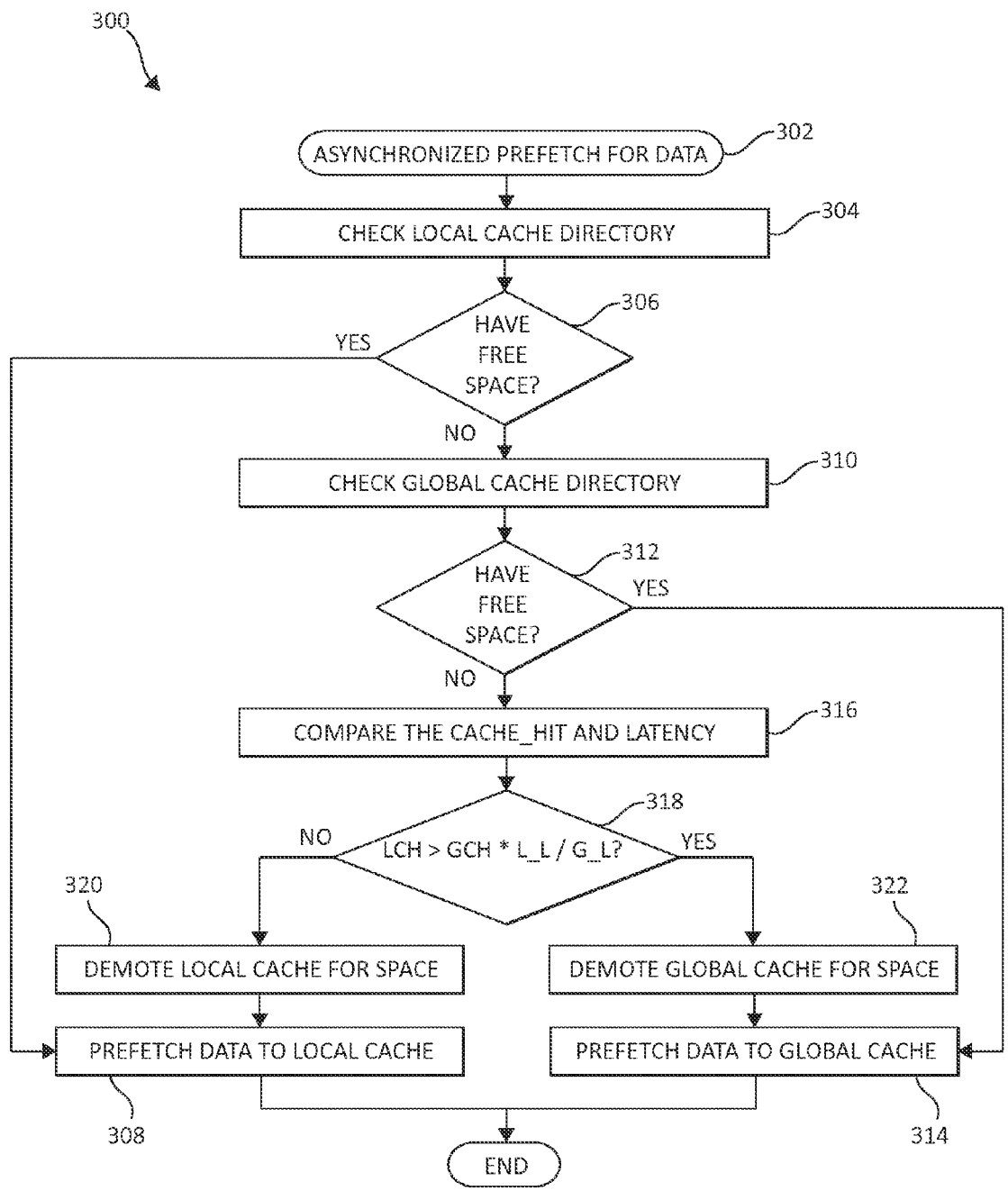
FIG. 3 is a flow diagram illustrating a method for prefetching data for a cache, according to an embodiment.

FIG. 3 is a flow diagram illustrating a method 300 for pre-fetching data for a cache, according to an embodiment. An asynchronized prefetch data request is received at 302. The prefetch request may be triggered by the read request directed to the direct storage access at 216 in method 200 and can occur at some time after the receipt of that request, for example, after a predetermined period of time, at a scheduled time after request receipt, or at another time. Local cache directory 124 is checked at 304, and a determination is made as to whether associated local cache 116 has free space at 306. If local cache 116 has free space for storing the prefetched data, the prefetched data is stored at local cache 116 at 308 and method 300 ends.

If local cache 116 does not have free space, global cache directory 128 is checked at 310. A determination is made as to whether global cache 118 has free space for storing the prefetched data at 312. If so, the prefetched data is stored at global cache 118 at 314 and method 300 ends. If not, the local cache access latency (L_L) and the average global cache access latency (G_L) are compared and the "cache hit" of the local cache 116 (LCH) and the cache hit of the global cache 118 (GCH) are compared at 316. Access latency and cache hit are calculated by cache arbitrator 134 as described above and entered into the following formula: LCH>GCH*L_L/G_L at 318.

If after calculation the aforementioned statement is not true, then a portion of local cache 116 is demoted at 320, and the prefetched data is stored at local cache 116 at 308 and method 300 ends. In particular, a percentage of free space of global cache 118, for example, about 0.1%, is re-allocated to local cache 116 so that local cache 116 has free space for storing the pre-fetched data. If global cache 118 of one node 102 or 104 does not have free space, then some of the contents in global cache 118 are swapped with free cache segments in global cache directory 122. In an embodiment, global cache 118 of node 102 may swap a portion of its contents for free space on global cache 118 of node 104. If no free space is available on any global cache 118 of any of the nodes 102 or 104, a lower portion of the LRU list (specifically, the portion of the LRU list including content least recently used) is demoted, the portion of space on which the demoted content was stored is then re-allocated to local cache 116 and the prefetched data is stored on local cache 116.

If LCH>GCH*L_L/G_L is true, then a portion of global cache 118 is demoted for free space at 322. The prefetched data is stored at global cache 118 at 314 and method 300 ends. Specifically, a percentage of free space from local cache 116, for example, about 0.1%, is allocated to global cache 118. If local cache 116 does not have free space, the lower part of the LRU list is demoted and the portion of local cache 116 on which the demoted contents was stored is used for re-allocation to global cache 118. As a result, space is freed for use as a portion of global cache 118 and for storing the prefetched data.

By partitioning a main cache of a corresponding node into a global cache and a local cache and sharing each global cache of each node with other ones of the nodes of the multiple nodes, a multi-nodal system takes advantage of caches on every node. Additionally, dynamically adjusting a ratio of an amount of space of the main cache making up the global cache and an amount of space of the main cache making up the local cache, based on access latency and cache hit over a predetermined period of time of each of the global cache and the local cache allows the system to optimize efficiency and space usage for caching data. Specifically, the dynamically adjusting re-allocates a portion of the global cache to the local cache or the local cache to the global cache to increase the ratio of the amount of space of the main cache making up the global or local cache to the amount of space of the main cache making up the local or global cache, if the cache hit of the local cache is greater than the cache hit of the global cache multiplied by the access latency of the local cache divided by the access latency of the global cache or vice versa.

By adjusting the local to global cache ratio, prefetched data can typically be stored on caches of nodes that most frequently access the data. In this regard, when responding to a prefetch data request, a determination is made as to whether the local cache of a selected node of the multiple nodes has free space. Data is prefetched to the local cache of the selected node, if the local cache of the selected node has free space. A determination is made as to whether the global cache of one of the nodes in the system has free space, if the local cache of the selected node does not have free space. Data is prefetched data to the global cache, if the global cache of one of the nodes has free space. Portions of either the local cache of the selected node or the global cache of one of the nodes are demoted to create free space, if the global caches do not have free space. Data is prefetched to the free space created due to the demoting, and hence, the main cache of a server node will more often than not have space for storing the prefetched data.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of managing storage cache resources among multiple nodes within a cluster environment, the method comprising:
    partitioning a main cache of a corresponding node into a global cache and a local cache;
    sharing each global cache of each node with other ones of the nodes of the multiple nodes;
    dynamically adjusting a ratio of an amount of space of the main cache making up the global cache and an amount of space of the main cache making up the local cache, based on access latency and cache hit over a predetermined period of time of each of the global cache and the local cache;
    in response to a prefetch data request, determining whether the local cache of a selected node of the multiple nodes has free space;
    prefetching data to the local cache of the selected node if the local cache of the selected node has free space;
    determining whether the global cache of one of the multiple nodes has free space, if the local cache of the selected node does not have free space;
    prefetching data to the global cache, if the global cache one of the multiple nodes has free space;
    demoting portions of either the local cache of the selected node or the global cache of one of the multiple nodes to create free space, if the global cache of one of the multiple nodes does not have free space; and
    prefetching data to the free space created due to the demoting;
        wherein the step of selecting includes comparing the cache hit and the access latency of the local cache of the selected node to the cache hit and the access latency of the global cache of all of the nodes; and
        the step of dynamically adjusting includes re-allocating a portion of the global cache to the local cache to increase the ratio of the amount of space of the main cache making up the global cache to the amount of space of the main cache making up the local cache, if the cache hit of the local cache is greater than the cache hit of the global cache multiplied by the access latency of the local cache divided by the access latency of the global cache.

2. The method of claim 1, wherein the step of demoting including demoting portions of the global cache for the free space, if the cache hit of the local cache is greater than the cache hit of the global cache multiplied by the access latency of the local cache divided by the access latency of the global cache.

3. The method of claim 1, wherein:
    the step of selecting includes comparing the cache hit and the access latency of the local cache of the selected node to the cache hit and the access latency of the global cache of all of the nodes; and
    the step of dynamically adjusting includes re-allocating a portion of the local cache to the global cache to increase the ratio of the amount of space of the main cache making up the local cache to the amount of space of the main cache making up the global cache, if the cache hit of the local cache is less than the cache hit of the global cache multiplied by the access latency of the local cache divided by the access latency of the global cache.

4. The method of claim 3, wherein the step of demoting including demoting portions of the local cache for the free space, if the cache hit of the local cache is less than the cache hit of the global cache multiplied by the access latency of the local cache divided by the access latency of the global cache.

5. A system for managing storage cache resources among multiple nodes within a cluster environment, the system comprising:
    a plurality of nodes each including:
        a memory having a main cache; and
        a processor device coupled to the memory, wherein the processor device is configured for:
            partitioning the main cache of a corresponding node into a global cache and a local cache;
            sharing the global cache of the corresponding node with other ones of the plurality of nodes;
            dynamically adjusting a ratio of an amount of space of the main cache making up the global cache and an amount of space of the main cache making up the local cache, based on access latency and cache hit over a predetermined period of time of each of the global cache and the local cache;
            in response to a prefetch data request, determining whether the local cache of a selected node of the multiple nodes has free space;
            prefetching data to the local cache of the selected node, if the local cache of the selected node has free space;
            determining whether the global cache of one of the multiple nodes has free space, if the local cache of the selected node does not have free space;
        prefetching data to the global cache, if the global cache one of the multiple nodes has free space;
            demoting portions of either the local cache of the selected node or the global cache of one of the multiple nodes to create free space, if the global cache of one of the multiple nodes does not have free space; and
            prefetching data to the free space created due to the demoting;
                wherein the step of selecting includes comparing the cache hit and the access latency of the local cache of the selected node to the cache hit and the access latency of the global cache of all of the nodes; and
                the step of dynamically adjusting includes re-allocating a portion of the global cache to the local cache to increase the ratio of the amount of space of the main cache making up the global cache to the amount of space of the main cache making up the local cache, if the cache hit of the local cache is greater than the cache hit of the global cache multiplied by the access latency of the local cache divided by the access latency of the global cache.

6. The system of claim 5, wherein processor device is further configured for, in the demoting, demoting portions of the global cache for the free space, if the cache hit of the local cache is greater than the cache hit of the global cache multiplied by the access latency of the local cache divided by the access latency of the global cache.

7. The system of claim 5, wherein processor device is further configured for:
   in the selecting, comparing the cache hit and the access latency of the local cache of the corresponding node to the cache hit and the access latency of the global cache of all of the nodes; and
   the dynamically adjusting, re-allocating a portion of the local cache to the global cache to increase the ratio of the amount of space of the main cache making up the local cache to the amount of space of the main cache making up the global cache, if the cache hit of the local cache is less than the cache hit of the global cache multiplied by the access latency of the local cache divided by the access latency of the global cache.

8. The system of claim 7, wherein processor device is further configured for in the step demoting, demoting portions of the local cache for the free space, if the cache hit of the local cache is less than the cache hit of the global cache multiplied by the access latency of the local cache divided by the access latency of the global cache.

9. The system of claim 5, wherein one node of the plurality of nodes is configured to coordinate the shared global caches of the plurality of nodes.

10. The system of claim 5, wherein the processor device is further configured for managing the local cache for local data usage using a local cache directory.

11. A computer program product for managing storage cache resources among multiple nodes within a cluster environment, the computer program product comprising a non-transitory computer-readable storage medium having computer-readable program code portions stored therein, the computer-readable code portions comprising:
   computer-readable code for partitioning a main cache of a corresponding node into a global cache and a local cache;
   computer-readable code for sharing each global cache of each node with other ones of the nodes of the multiple nodes; and
   computer-readable code for dynamically adjusting a ratio of an amount of space of the main cache making up the global cache and an amount of space of the main cache making up the local cache, based on access latency and cache hit over a predetermined period of time of each of the global cache and the local cache;
   computer-readable code for, in response to a prefetch data request, determining whether the local cache of a selected node of the multiple nodes has free space;
   computer-readable code for prefetching data to the local cache of the selected node, if the local cache of the selected node has free space;
   computer-readable code for determining whether the global cache of one of the multiple nodes has free space, if the local cache of the selected node does not have free space;
   computer-readable code for prefetching data to the global cache, if the global cache one of the multiple nodes has free space;
   computer-readable code for demoting portions of either the local cache of the selected node or the global cache of one of the multiple nodes to create free space, if the global cache of one of the multiple nodes does not have free space; and
   computer-readable code for prefetching data to the free space created due to the demoting;
      wherein the step of selecting includes comparing the cache hit and the access latency of the local cache of the selected node to the cache hit and the access latency of the global cache of all of the nodes; and
      the step of dynamically adjusting includes re-allocating a portion of the global cache to the local cache to increase the ratio of the amount of space of the main cache making up the global cache to the amount of space of the main cache making up the local cache, if the cache hit of the local cache is greater than the cache hit of the global cache multiplied by the access latency of the local cache divided by the access latency of the global cache.

12. The computer program product of claim 11, wherein the computer-readable code for demoting includes computer-readable code for demoting portions of the global cache for the free space, if the cache hit of the local cache is greater than the cache hit of the global cache multiplied by the access latency of the local cache divided by the access latency of the global cache.

13. The computer program product of claim 11, wherein:
   the computer-readable code for selecting includes computer-readable code for comparing the cache hit and the access latency of the local cache of the selected node to the cache hit and the access latency of the global cache of all of the nodes; and
   the computer-readable code for dynamically adjusting includes computer-readable code for re-allocating a portion of the local cache to the global cache to increase the ratio of the amount of space of the main cache making up the local cache to the amount of space of the main cache making up the global cache, if the cache hit of the local cache is less than the cache hit of the global cache multiplied by the access latency of the local cache divided by the access latency of the global cache.

14. The computer program product of claim 13, wherein the computer-readable code for demoting includes computer-readable code for demoting portions of the local cache for the free space, if the cache hit of the local cache is less than the cache hit of the global cache multiplied by the access latency of the local cache divided by the access latency of the global cache.

* * * * *